E. E. GOLD.
GASKET FOR HOSE COUPLINGS.
APPLICATION FILED MAR. 5, 1915.
1,163,082.
Patented Dec. 7, 1915.
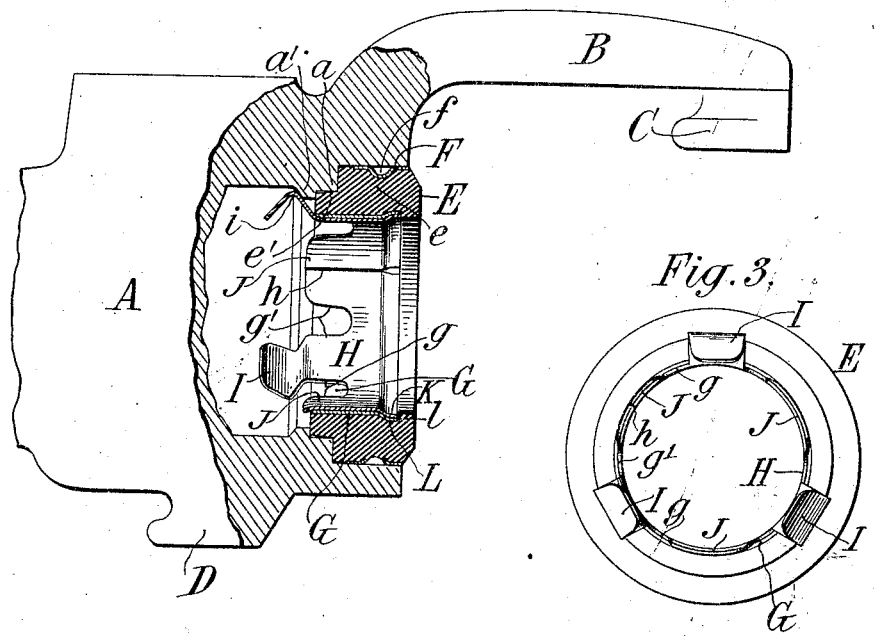
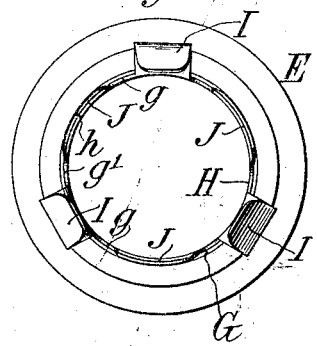
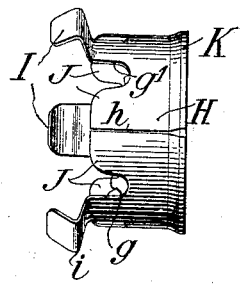
WITNESSES:
Rene' Bruine
Fred White
INVENTOR
Edward E. Gold,
By Attorneys,
Fraser, Funk & Myers

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

GASKET FOR HOSE-COUPLINGS.

1,163,082.

Specification of Letters Patent.

Patented Dec. 7, 1915.

Application filed March 5, 1915. Serial No. 12,378.

*To all whom it may concern:*

Be it known that I, EDWARD E. GOLD, a citizen of the United States, residing in the borough of Manhattan, city, county, and State of New York, have invented certain new and useful Improvements in Gaskets for Hose-Couplings, of which the following is a specification.

My invention relates to gaskets for hose couplings, and is particularly adapted for use in the mating ends of couplers for steam hose.

It has for its object to provide means whereby the gasket may be more certainly held in place, and consists in providing the spring retaining ring which has tongues for engaging behind shoulders in the bore of the coupler with which such gaskets are frequently equipped, with means whereby the said retaining ring is more certainly held in place in the gasket during the act of inserting the gasket in the coupler.

Other objects of my invention are hereinafter set out.

A desirable form in which my invention may be embodied is illustrated in the accompanying drawings, wherein,—

Figure 1 illustrates a portion of one coupler head having a gasket therein with my invention applied thereto shown in cross-section; Fig. 2 is a side elevation of a retaining spring embodying my invention separate from the gasket; Fig. 3 is a bottom view of a gasket having my invention applied thereto.

My invention is illustrated in connection with a hose coupler of the ordinary Gold type wherein two mating heads are employed, each being a counterpart of the other, and each having a gasket in its direct port. The drawing illustrates one of the said coupler heads, and this comprises a body A having a projecting arm B which carries a lug C that engages over a projection on the mating coupler corresponding to the projection D. The gasket E is of the type known as a fixed gasket. It is provided with a circumferential band F having an annular groove $f$ which is seated in the body $e$ of the gasket to prevent movement of the band relative to the gasket. The gasket has a recessed portion at $e^1$ which is seated on a corresponding seat $a$ in the coupler bore. The gasket is usually provided with an inner metal band or frame G, and this band or frame together with the outer band F serve the purpose of enabling the gasket to hold its shape under extreme heat and pressure and prevent it from spreading out.

The foregoing constructions form no part of the present invention, which resides in an improvement in the means whereby the gasket is held in position in the coupler bore.

The gasket is provided with a split ring H, which is of metal having sufficient spring so that when inserted in the gasket it will be spring-pressed outwardly. This ring has spring tongues I each of which projects inwardly from the gasket and into the bore of the coupler, and is provided with an outwardly bulged portion $i$ which engages behind a shoulder $a^1$ in the coupler bore and holds the gasket in position.

According to my invention means are provided for increasing the spring of the tongues I, by forming slots $g$ $g^1$ in the body of the gasket on each side of the spring tongues I, and these extend substantially one half the axial length of the ring. The body of the ring between two adjacent spring tongues I is extended substantially the full axial length of the ring between the cut away portions $g$ $g^1$, and in the construction illustrated, there being three spring tongues I, there will be three of such extensions each of which forms short tongues J. The said tongues J increase the extent of contact between the ring and the gasket and consequently enable the ring to be more certainly held in place in the gasket. According to my invention I also provide means for preventing the ring H being displaced while the gasket is being inserted into position in the coupler. The said ring is provided with outward projections which as illustrated take the form of the flange K with which the outer edge of the ring opposite the spring tongues is provided. The gasket has a recess to receive the said projection, and this recess is illustrated as a circumferential groove L in which the outer end of the band G is seated, and which is preferably provided with a straight edge shoulder $l$ against which the edge of the flange K bears. It will therefore be perceived that the axial strain upon the ring consequent upon its insertion in the bore of the coupler will not have the effect of displacing the said ring in the gasket body, as the flange K will bear against the straight edge $l$, which acts as a stop to hold the ring in position. For the purpose of assisting this effect, the ring is formed as a split ring having a split at $h$, and the ring is separated at this point for insertion in the gasket body, and when inserted it springs outwardly so as to cause its flange to enter the groove in the ring. The ring is of such size with relation to the gasket that when it is fully expanded the edges of the ring at the split $h$ will just pass each other and form a butt joint, as illustrated in Fig. 3, and the said edges will then be touching one another and will cause the split ring to be rigidly held in position.

The accompanying drawings illustrate the best form of constructing my invention now known to me, but I do not concede that it illustrates the only form, as modifications thereof within the limits of the appended claims will suggest themselves to the skilled mechanic, and may be employed.

I claim as my invention:—

1. In a gasket for hose couplings, having a body portion adapted to enter a seat in a coupler head, a split ring adapted to be received within said gasket body and having spring tongues projecting from its inner side and adapted to extend in a bore of the coupler and engage behind a shoulder therein and retain the gasket in its seat, means for increasing the spring of the tongues comprising forming the said ring with grooves on each side of said tongues, said gasket formed with a recess and a projection in the ring adapted to enter said recess, and the ends of said ring adapted to abut together when the ring is in place, whereby the ring is held in position in the gasket while the gasket is being seated in the coupler.

2. In a gasket for hose couplings, having a body portion adapted to enter a seat in a coupler head, a split ring adapted to be received within said gasket body and said gasket also having means coöperating with the coupler to retain the gasket in its seat, means for holding the said ring in position while the gasket is being seated in the coupler, said means comprising a shouldered recess in the gasket and a flange in the ring adapted to enter said recess, the outer edge of said ring flange abutting against said shoulder being limited in radial dimension to the thickness of the ring, and the ends of the ring adapted to abut together when the ring is in place whereby the ring is held in position in the gasket while the gasket is being seated in the coupler.

3. In a gasket for hose couplings, having a body portion having a seat in a coupler head, a split ring having spring tongues projecting from its inner side and adapted to extend in a bore of the coupler and engage behind a shoulder therein and retain the gasket in its seat, means for holding the said ring in position while the gasket is being seated in the coupler, said means comprising an annular groove in the inner wall of said gasket near its face, said groove having a substantially straight outer wall extending radially of the gasket, a flange formed on the outer edge of said ring by flaring the said ring outwardly, the outer edge of said flange abutting against the shoulder being limited in radial dimension to the thickness of the ring, the said ring adapted to expand upon insertion in the gasket, and the ends of said ring adapted to abut together when the ring is in place whereby and by reason of the engagement of the outer edge of the flange on the ring against the straight edge of the shoulder in the gasket the said ring is held in place in the gasket while the gasket is being seated in the coupler.

In witness whereof, I have hereunto signed my name in the presence of two subscribing witnesses.

EDWARD E. GOLD.

Witnesses:
HENRY M. TURK,
CHAS. LYON RUSSELL.